Patented Sept. 3, 1940

2,213,331

UNITED STATES PATENT OFFICE 2,213,331

CHLORINATED SYNTHETIC RESIN

Maurice H. Arveson, Chicago, Ill., assignor to Standard Oil Company, Chicago, Ill., a corporation of Indiana No Drawing. Application March 4, 1936, Serial No. 67,092

13 Claims. (Cl. 260—94)

This invention relates to a new product of manufacture and the process of making it. The product is a synthetic resin possessing unusual properties and is derived from hydrocarbons by a process of polymerization and chlorination. The finished product is a chlorinated synthetic hydrocarbon resin having a considerable range of characteristics depending upon the manner and extent to which the polymerization and chlorination steps are conducted.

The new resin is manufactured in the following manner: liquid olefin hydrocarbons, and especially liquefied normally gaseous hydrocarbons, containing iso-olefins, for example isobutylene, are subjected to the polymerizing action of metal halide catalysts, particularly aluminum chloride, boron chloride or boron trifluoride, by which they are converted into high molecular weight plastic hydrocarbon resins. The molecular weight of these intermediate products may vary from 800 to 12,000 or higher and is affected considerably by the temperature at which the polymerization is conducted. It is preferred to employ temperatures below 30 deg. F. and a temperature of —40 to —80 deg. F. is desirable.

The intermediate high molecular weight hydrocarbon resin is then subjected to the action of chlorine in the presence of a catalyst such as sunlight and it is preferred to employ during the chlorination a suitable diluent or solvent such as carbon tetrachloride, ethylene dichloride, hexane, solvent naphtha, etc.

When the desired amount of chlorination has occurred, the chlorinated product is recovered from the reaction mixture. The amount of chlorine which I introduce into the product may vary considerably depending upon the characteristics desired in the final resin and it may suitably vary from 5 to 75%, although an intermediate amount of chlorination from 15 to 55% is usually most desirable.

In a specific example a 10% solution of a resin from iso-butylene polymerization was prepared, using carbon tetrachloride as the solvent. A rapid stream of chlorine was introduced into the solution in the presence of sunlight. In about 20 minutes the resin had become chlorinated to a white solid product which precipitated from the solvent. After removal of all the solvent by evaporation, the product was recovered as a friable mass.

In another example, liquid isobutylene was cooled to a temperature of —80 deg. F. and treated with about 0.5% of $BF_3$ with rapid agitation and cooling. In a short time, after the reaction was completed, the mixture was allowed to warm up and the hydrocarbon resin intermediate was obtained as a plastic colorless sticky mass. After freeing this product from $BF_3$ it was dissolved in carbon tetrachloride and chlorinated until the chlorine content reached 32%. After removal of solvent, the chlorinated resin obtained was a hard, brittle, yellow, glassy solid at ordinary temperatures, but it softened on heating to 125 deg. F. It was soluble to the extent of 1/2% in a light lubricating oil of about 150 to 200 seconds Saybolt viscosity (at 100 deg. F.).

In still another example a quantity of liquefied hydrocarbon gases boiling about the range of butane and butylene and containing about 20 to 40% of isobutylene, which was obtained from the cracking of petroleum hydrocarbon oils, was cooled to a temperature of about —40 to —80 deg. F. and polymerized with $BF_3$. The product was recovered from solution in unreacted hydrocarbon and chlorinated to the extent of 45% chlorine. A white solid powder was obtained which was substantially insoluble in hexane but easily soluble in benzene. When using liquefied cracking still gases it is preferred to employ a gas mixture containing at least 10% of isobutylene.

Other olefins besides isobutylene may be employed as the starting material, for example normal isoamylene and butylene may be employed if desired. The olefin may be diluted with an inert solvent such as carbon tetrachloride or hexane and when the polymerization with aluminum chloride or boron fluoride is completed, the product may be chlorinated directly without removing the hydrocarbon resin intermediate from the solution. If hexane is used as a solvent and the chlorination is continued to over 20%, substantially all of the chlorinated resin may be obtained as a precipitate. If chlorination is carried out to a lesser extent, however, the chlorinated product will remain in solution in hexane and may be recovered by evaporation of the solvent therefrom.

As indicated previously, the characteristics of my new chlorinated resin product vary considerably depending upon the method of manufacture and especially upon the degree to which the hydrocarbon resin intermediate is chlorinated. In general, products containing less than 20% of chlorine are plastic at ordinary temperatures, whereas more highly chlorinated products are solids. The solid products, however, become plastic on heating and may therefore be molded into various shapes when heated. The products having a relatively low chlorine content of the order of 5 to 10% are soluble in mineral oils and may be employed as addition agents to lubricating oils for increasing the viscosity and viscosity index thereof and conferring special properties such as the property of preventing seizure of metal surfaces under extreme pressure as in the case of gear lubricants, cutting oils and the like.

I may also further react our chlorinated resin, especially those grades containing from 5 to 20% of chlorine, with other materials, particularly aromatic hydrocarbons such as benzene, toluene, cymene, naphthalene, etc. For example a chlor-resin containing about 10% of chlorine was mixed with about 10% of naphthalene and subjected to the catalytic action of anhydrous aluminum chloride with agitation and heating to a temperature of 100 to 300° F. The reaction mixture was washed with water in the presence of an added solvent and the product neutralized to remove aluminum chloride. The product was a high molecular weight oily resin containing very little chlorine and suitable as an addition agent to lubricating oils, greases, gear lubricants, and other compositions where a heavy non-volatile body producing agent is desired. Instead of condensing the chlor-resin with aromatic hydrocarbons in this manner it may likewise be treated alone with suitable catalysts such as aluminum chloride, especially aluminum chloride promoted with hydrochloric acid gas whereby a polymerization of the resin occurs and products of still higher molecular weight and greater viscosity are obtained. The aluminum chloride catalyst may be formed in situ by agitating the chlor-resin with finely divided metallic aluminum.

My chlorinated resins are substantially all soluble in benzene or mixtures of benzene and acetone containing more than 1/3 part of benzene. Chlor-resins of higher chlorine content, appreciably above 20%, are insoluble in acetone and hexane. This property may be employed advantageously in purifying my chlor-resin products and separating them in accordance with their chlorine content. Thus the crude chlorinated resin product, for example a product containing an average of 30% of chlorine, may be dissolved in benzene and precipitated by the addition of hexane, acetone or similar solvents, in which case the components of the mixture containing the most chlorine are first separated. The resins of lower chlorine content and lower molecular weight remain in a solution and may be recovered therefrom.

All the chlor-resins are soluble in carbon tetrachloride although in the case of the more highly chlorinated resins heating is required to effect rapid solution. The more concentrated solutions of the chlor-resins are quite viscous and can best be prepared by dissolving the resin in an excess of solvent and evaporating the excess. These solutions may be used for coating metals, wood, paper, etc., and drying oils and other modifying agents may be added also.

The solubility of the chlor-resins in petroleum lubricating oils decreases rapidly with increasing chlorine content. Thus a resin containing 32% of chlorine was soluble to the extent of about 1% in a lubricating oil of 180 seconds Saybolt viscosity at 100 deg. F., whereas a resin containing 47% chlorine was substantially insoluble in the same oil. The more highly chlorinated resin was soluble to the extent of about 1% in a heavier lubricating oil of Coastal origin.

One of the important characteristics of my chlorinated resin is its non-flammability when containing appreciable amounts of chlorine. For example, a resin containing 47% chlorine will not support combustion and because of this property it may be applied to fabrics, wood and paper products and other inflammable materials to reduce their flammability. When applied as a size to paper, it renders the latter resistant to penetration by oil.

In the case of the more highly chlorinated resins having chlorine concentrations above 50% a part of the chlorine may be disengaged in the form of hydrochloric acid, which may sometimes be objectionable when the resin is employed in the presence of cellulosic materials or metals. This objection may be overcome by lightly treating such highly chlorinated products with a caustic soda solution whereby the easily disengaged chlorine is removed. Stability may also be conferred by compounding the resin with suitable stabilizing agents such as the aromatic amines and phenols.

As previously indicated, my new chlorinated resin is especially useful in the manufacture of lacquers and varnishes and various requirements may be met by regulating the amount of chlorine contained in resin. Thus a resin containing 45% of chlorine may readily be dissolved in benzene and applied as a protective lacquer to brass, silver, nickel and other metals and the extreme resistance of the product to attack by chemical agents makes it especially valuable as a protective coating when exposed to the weather or to the action of corrosive gases, salt spray, etc. When applied as a coating to canvas or other fabrics or leather, wooden articles, etc., substantial water-resistant properties are conferred thereto.

Chlorinated resins having an intermediate or lower chlorine content of the order of 10 to 30% may be employed in the manufacture of paints and varnishes in conjunction with drying oils such as linseed oil, tung oil, etc. Chlor-resin may also be combined with beeswax, paraffin, carnauba wax, castor oil, cotton seed oil, oil of mirbane, etc., in the manufacture of furniture polish, automobile and leather polishes and coating compounds.

The chlor-resin may also be compounded with rubber, synthetic rubber, chlorinated rubber, hydrochlor rubber and hydrogenated rubber in making various plastic materials for use as cements, molding compositions, protective coatings, etc. Cements made of chlor-resin by dissolving it in suitable solvent such as benzene may be used to seal paper and cellulose products generally, including Cellophane and Celluloid and synthetic resins such as phenol formaldehyde resins, glyptal resins, etc. Such cements are valuable for making duplex papers, duplex sheet rubber and for cementing rubber to wood, glass, metal, cork, etc. They may be used for impregnating and cementing paper employed in electrical insulation and the chlorinated resin may be used for increasing the di-electric properties of oils employed in transformers, cables etc. When applied to paper a solution of the more highly chlorinated resin will increase the transparency of the paper, for example wrapping papers and envelope windows.

My chlorinated resin may also be employed in the manufacture of laminated glass as a plastic adhesive between two sheets of glass, alone or in conjunction with other plastic resins such as cellulose acetate. It may be employed in a waterproofing composition for Cellophane, preferably in conjunction with waxes, for example Halowax. When mixed with waxes it may be employed in production of carbon papers, stencil papers, etc. When formed into thin films or sheets, which may suitably be accomplished by drying a concentrated solution on a metal surface, the resin may be applied as a surface for prints on paper and leather products which may be conveniently done by warming and pressing the film on the surface of the material to be protected. It may be applied to adhesive tapes of paper or cloth either alone or in combination with natural rubber.

My resin may also be added as a plasticizer or modifier to natural rubber, synthetic rubber or chloracetylene rubber, either alone or with other compounding materials such as antioxidants, vulcanization accelerators, etc. From 10 to 50% may be milled with the rubber. When mixed with wood fiber, sawdust, asbestos, etc. a plastic product is produced which is suitable for molding operations. An asbestos fiber composition, molded under high pressure and hot, forms a fireproof product which may be employed in building construction, etc. When placed between layers of paper or fabric the resin may be employed in the molding of electric insulators and other products required to have a high resistance to moisture and electricity.

Although I have described my invention with respect to certain desirable properties and uses of our new product, I intend to include other uses such as the conversion of the chlorinated product to other useful materials by well known reactions; for example, I may treat my chlorinated product with caustic alkali to remove a substantial part of the chlorine and produce derivatives which may be sulfonated to give valuable products. I may also remove the chlorine by treatment with dry sodium hydroxide or by heating with zinc dust or other metal or metal oxide, producing unsaturated compounds, rubber-like hydrocarbons and other hydrocarbons having different solubility characteristics from those of the chlorinated product. I may also subject my chlorinated resin derivative to the action of metallic sulfides or poly-sulfides such as sodium polysulfide, thereby converting the chlorinated product into a sulfur containing, rubber-like material suitable for rubber compounding.

I claim:

1. The process of manufacturing resins, comprising polymerizing a low molecular weight aliphatic isoolefin hydrocarbon to produce an intermediate hydrocarbon resin having a molecular weight above 800 and chlorinating said intermediate hydrocarbon resin in the presence of sunlight.

2. The process of claim 1 wherein between 5% to 75% chlorine is introduced into the intermediate hydrocarbon resin.

3. The process of claim 1 wherein the intermediate hydrocarbon resin is dissolved in a solvent inert to the action of chlorine before the chlorination step.

4. The process of claim 1 wherein the said low molecular weight hydrocarbon is polymerized in the presence of a metal halide catalyst at a temperature below 30° F.

5. The process of claim 1 wherein the said low molecular weight hydrocarbon is polymerized in the presence of a metal halide catalyst at a temperature between —40° F. and —80° F.

6. A new composition of matter comprising a synthetic solid plastic resin produced by chlorinating a solution of polymerized isobutylene having a high molecular weight in carbon tetrachloride and in the presence of sunlight.

7. A high molecular weight plastic resin containing from 5% to 75% of chlorine produced by the chlorination in the presence of sunlight of a synthetic polymerized isoolefin aliphatic hydrocarbon resin having the empirical formula of $C^nH_2^n$ and a molecular weight above 800.

8. A high molecular weight plastic resin containing from 5% to 75% of chlorine resulting from the chlorination in the presence of sunlight of a polymerized hydrocarbon resin having a molecular weight above 800 derived from the polymerization of an aliphatic isoolefin hydrocarbon.

9. The process of producing resins, comprising treating liquid isobutylene with boron fluoride at a low temperature whereby a plastic hydrocarbon resin having a molecular weight above 800 is produced and subsequently treating said plastic hydrocarbon resin with chlorine in the presence of sunlight and continuing said chlorination until between 5% and 75% of chlorine has been combined.

10. The process of manufacturing resins which comprises polymerizing liquid isobutylene with boron fluoride at a temperature below 30° F. whereby there is produced a hydrocarbon resin having a molecular weight between about 800 and 12,000, treating said resin with chlorine in the presence of sunlight until between 15% and 55% of chlorine has been absorbed and recovering the chlorinated product from the reaction mixture.

11. The process of claim 10 wherein the chlorinated hydrocarbon resin is treated with a basic dechlorinating reagent to partially dechlorinate said chlorinated resin and increase the stability thereof.

12. A new composition of matter comprising a synthetic plastic resin having between about 20 and 50% of chlorine stably combined with polymerized isobutylene having a molecular weight between about 800 and 12,000, said synthetic plastic resin having been produced by chlorinating said polymerized isobutylene in the presence of sunlight.

13. A new composition of matter comprising a synthetic solid plastic resin, containing 30 to 75% of chlorine, produced by sunlight catalyzed chlorination of polymerized isobutylene of high molecular weight in solution in a solvent resistant to the action of the chlorine.

MAURICE H. ARVESON.